United States Patent [19]

Imagawa et al.

[11] 3,797,556

[45] Mar. 19, 1974

[54] METHODS OF PRODUCING ACCURATE BORE SURFACES

[76] Inventors: Tameichi Imagawa, No. 8564-Choma Sakuragi-Cho, Ohmiya; Kaname Kitsuda, No. 28-47 Matsukaze-Cho, Hiratsuka, both of Japan

[22] Filed: Oct. 18, 1972

[21] Appl. No.: 298,775

[52] U.S. Cl. ................................................. 164/95
[51] Int. Cl. .......................................... B22d 19/08
[58] Field of Search .......................... 164/94, 95, 75

[56] References Cited
UNITED STATES PATENTS
3,401,736  9/1968  Imagawa ............................. 164/95
3,450,189  6/1969  MacDonald ......................... 164/95

Primary Examiner—Robert D. Baldwin
Attorney, Agent, or Firm—Young & Thompson

[57] ABSTRACT

A method of producing a hard, thermal- and wear-resistant bore surface in the inner periphery of a cylinder made of metals, for example, aluminum or its alloy by means of a spray coated layer applied to an accurately finished surface of a hollow cylindrical support member. The spray coated layer applied to the hollow cylindrical support member is used as a hollow mold core. This hollow mold core is incorporated into a casting mold so as to form mold cavity into which is poured molten aluminum or its alloy. The hollow cylindrical support member is removed from the casting to expose the inner surface of the spray coated layer. The exposed inner surface of the spray coated layer is transplanted from the hollow cylindrical support member to the casting and defines an accurate bore surface.

2 Claims, 7 Drawing Figures

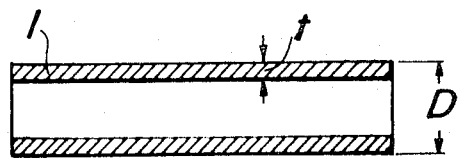
FIG_1
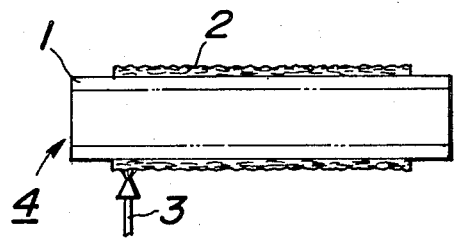
FIG_2
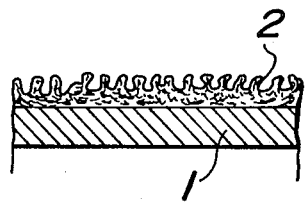
FIG_3

FIG_4
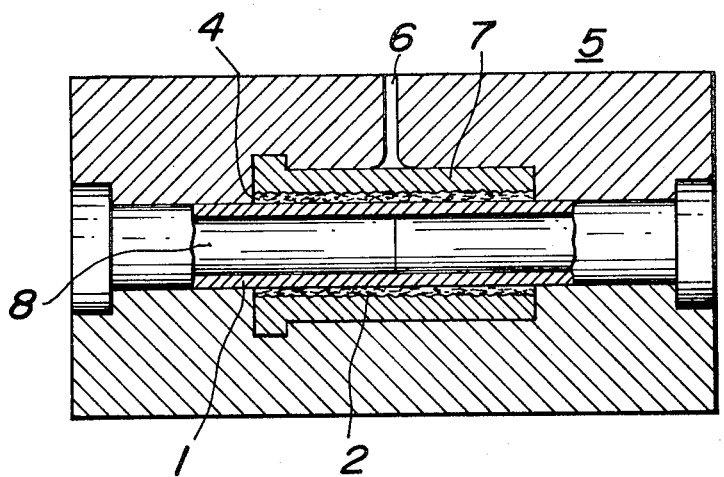
FIG_5
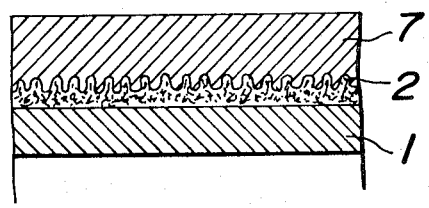

FIG_6
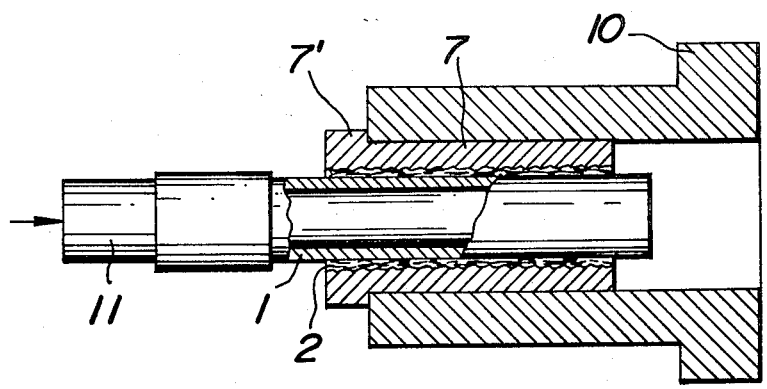
FIG_7
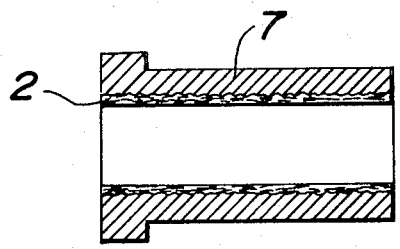

METHODS OF PRODUCING ACCURATE BORE SURFACES

This invention relates to methods of producing accurate bore surfaces, and more particularly to a method of producing a hard, thermal- and wear- resistant bore surface in the inner periphery of a cylinder made of metals, for example, aluminum or its alloys by means of a spray coated layer applied to a metal mold core and transplanted to the metal cylinder.

The method of this kind has been well known as a transplant coating method.

In the conventional method of this kind, use has been made of a solid metal bar generally made of steel and applied with a spray coated layer so as to construct a metal mold core. The use of such solid metal bar shaped metal mold core has a number of disadvantages. In the first place, the metal mold core is solid and massive and hence poor in thermal conductivity so that the spray coated layer applied thereon is locally overheated during spraying thereof and hence there is a risk of the spray coated layer being cracked. Secondly, after spraying, the temperature of the spray coated layer becomes higher than that of the metal mold core, and as a result, during cooling, the spray coated layer could not freely shrink thereby remaining a tensile stress in the peripheral direction thereof. Third, after molten aluminum or alloy thereof has been poured in and around the spray coated layer, the spray coated layer sandwiched between the metal mold core and the casting is subjected to a compressive stress in a direction of the thickness thereof, and as a result, the spray coated layer is so strongly adhered to the outer surface of the metal mold core that it is extremely difficult to remove the metal mold core from the spray coated layer. Finally, after the removal of the metal mold core, the spray coated layer is released from the tensile stress acting on the pheripheral direction thereof and freely shrinks to form a gap between the outer periphery of the spray coated layer and the casting and the gap thus formed having a poor thermal conductivity causes various kind of troubles to occur which are detrimental to produce the accurate bore surface in the inner periphery of the casting.

An object of the invention is to obviate the above mentioned disadvantages and to provide an improved transplanting method of producing an accurate bore surface with the aid of a hollow cylindrical support member applied with a spray coated layer as a metal mold core, by which the hollow cylindrical support member can easily be removed from the mold core without deteriorating the spray coated layer.

Another object of the invention is to provide a method of producing such an accurate cylinder bore surface wherein the bore surface produced is extremely smooth and is of such accuracy that, at most, only a simple honing operation is required for finishing.

A further object of the invention is to provide a method of producing a cast cylinder sleeve for an internal combustion engine which requires no additional machining beyond a simple honing operation.

Still another object of the invention is to provide a method of applying a spray coated layer to a hollow cylindrical support member and then transplanting this spray coated layer onto an article produced in the mould by a casting technique.

In the specification, the term accurate bore shall be understood to designate a bore such, for example, as bearing bores of bimetallic bearing bushes, cylinder bores of internal combustion engines, etc., which can be formed be removing a hollow cylindrical support member from a spray coated layer permanently mechanically locked to a casting to a high degree of accuracy that, at most, only a simple honing operation is required for finishing.

According to the invention there is provided a method of producing an accurate bore surface comprising the steps of applying a spray coated layer to the accurately finished outer surface of a hollow cylindrical support member to construct a hollow mold core, said hollow cylindrical support member being made of a material having thermal expansion coefficient and thermal conductivity which are higher than those of said spray coated layer and having an outer diameter D slightly smaller than the inner diameter of said accurate bore surface and having such thickness $t$ that a ratio $D/t$ is equal to 8 to 30, inserting said hollow mold core into a casting mold to form an annular cavity between said hollow mold core and casting mold, pouring molten aluminum or its alloy into said annular cavity, solidifying said molten aluminum or its alloy to interlock it with the outer surface of said spray coated layer, and removing said hollow cylindrical support only from said spray coated layer interlocked with said aluminum or its alloy, whereby said bore surface is defined by the inner surface of said spray coated layer transplanted from said accurately finished surface of hollow cylindrical support member to said metal casting.

In one embodiment of the invention, it is preferable to use as said hollow cylindrical support member an extruded aluminum pipe.

A preferred embodiment of the invention is illustrated in the following drawings, in which:

FIG. 1 is a sectional view of a hollow cylindrical support member which can be used to produce an accurate bore surface by the method of the invention;

FIG. 2 is a sectional view of a hollow mold core constructed by applying a spray coated layer to the hollow cylindrical support member shown in FIG. 1 with the aid of a metalizing gun;

FIG. 3 is an enlarged fragmentary cross sectional view of the hollow mold core shown in FIG. 2;

FIG. 4 is a sectional view of a casting mold with the hollow mold core shown in FIG. 2 incorporated therein;

FIG. 5 is an enlarged fragmentary cross sectional view of a casting obtained by the casting mold shown in FIG. 4;

FIG. 6 is a sectional view of a die and punch for removing the hollow cylindrical support member from the hollow mold core; and FIG. 7 is a cross sectional view of a cast sleeve obtained after the removal of the hollow cylindrical support member and having an accurate bore surface.

Referring to FIG. 1, reference numeral 1 designates a hollow cylindrical support member made of an extruded aluminum pipe and having an outer diameter D of 38.14 mm and a thickness $t$ of 2.5 mm on the one hand and 3.5 mm on the other hand. Thus, a ratio $D/t$ is 15.3 and 10.9, respectively.

In and around the outer periphery of these two kinds of hollow cylindrical support members 1 are formed spray coated layers 2 whose thickness are 0.45 mm and 0.75 mm, respectively. The spray coated layer 2 is made of an iron alloy, for example, mild steel and applied in and around the hollow cylindrical support member 1 to form a hollow mold core 4 with the aid of a metalizing gun 3 (FIG. 2), the hollow cylindrical support member 1 being rotated about its longitudinal axis during spraying of the spray coated layer 2.

The spray coated layer 2 thus obtained is porous and is provided at its exterior with an irregularly pitted and undercut surface and at its interior facing the hollow cylindrical support member 1 with a smooth surface as shown in FIG. 3. During cooling the hollow cylindrical support member 1 reduces its diameter and is separated from the spray coated layer to form a gap on the order of 0.05 mm between the hollow cylindrical support member 1 and the spray coated layer 2 at the cold state.

Then, the hollow mold core 4 shown in FIG. 2 is incorporated into a split mold 5 to form a mold cavity between the spray coated layer 2 and the split mold 5 as shown in FIG. 4. Subsequently, molten aluminum or its alloy is poured through a gate 6 under a pressure of 200 Kg/cm$^2$ into the mold cavity to completely fill it with the molten metal 7 and to enter into all of the pits and undercuts on the exposed surface of the spray coated layer 2.

As the molten metal 7 solidifies, it shrinks in and around the spray coated layer 2 and is interlocked mechanically therewith forming a bond of tremendous strength. Within a few seconds after completion of pouring of the aluminum or its alloy, the two mold halves 5 are separated, and the casting 7 and the hollow mold core 4 are removed as a unit from the split mold 5.

8 designates a mandrel closely fitted in the center cavity of the hollow cylindrical support member 1.

In FIG. 5 is shown an enlarged cross section of the casting 7 interlocked with the spray coated layer 2 applied to the hollow cylindrical support member 1. The casting 7 shrinks in a radial direction to enter into all of the pits and undercuts on the exposed surface of the spray coated layer 2. Thus, the spray coated layer 2 is subjected to a strong contact pressure for compressing it in a radial direction, and as a result, the bimetallic casting 7 is subjected to a prestress.

The gap between the spray coated layer 2 and the hollow cylindrical support member 1 becomes far smaller than that prior to the casting operation, but this gap does not prevent removal of the hollow cylindrical support member 1 from the hollow mold core 4.

Eventually, the spray coated layer 2 may locally be adhered to the hollow cylindrical support member 1 whose hardness is smaller than that of the spray coated layer 2. In such a case, it is preferable to use a die 10 (FIG. 6) which is fitted around the casting 7, for example, a metal sleeve so as to abut its end against a flange 7' of the metal sleeve 7 and then use a punch 11 which serves to apply thrust to the hollow cylindrical support member 1, thereby effecting the removal thereof in an efficient manner.

In order to remove the hollow cylindrical support member 1 from the casting 7 in a more easy manner, it is preferable to apply, prior to the spraying, onto the outer surface of the hollow cylindrical support member 1 a mold releasing agent, for example, a thin separating layer consisting of a dry lubricant such as synthetic resin, graphite or molybdenum disulfide, etc.

In FIG. 7 is shown the bimetallic cast sleeve 7 after the hollow cylindrical support member 1 has been removed therefrom, the bore surface is defined by the inner surface of the spray coated layer 2 transplanted from the hollow cylindrical support member 1 to the cast sleeve 7 and has an inner diameter which is substantially equal to or slightly larger than the outer diameter of the hollow cylindrical support member 1 removed. The bore surface of the casting 7 is as smooth as the accurately finished exterior surface of the hollow cylindrical support member 1 over which it is formed.

As seen from the above description made with reference to the preferred embodiment shown in FIGS. 1 to 7, in accordance with the invention in the first place the hollow cylindrical support member 1 is subjected to an accurate machining operation so as to make its outer diameter D slightly smaller than the inner diameter of the accurate bore to be produced and make its thickness $t$ comparatively thin such that a ratio between the outer diameter D and thickness t D/$t$ is on the order of 8 to 30. Moreover, it is required that the hollow cylindrical support member 1 is made of a material, for example, aluminum having thermal expansion coefficient and thermal conductivity which are higher than those of the spray coated layer. In most instances, use may be made of an aluminum pipe extruded from a conventional extruder as the hollow cylindrical support member 1. The spray coated layer 2 may preferably be made of iron alloys, for example, mild steel and carbon steel or copper alloys, etc.

The thermal expansion coefficient of extruded aluminum (2S aluminum alloy) is $23.5 \times 10^{-6}$ /° C at a temperature of 20° to 100° C and the thermal conductivity thereof is 0.53 CGS, while the thermal expansion coefficient at a temperature of 20° to 100° C and thermal conductivity of the spray coated layer 2 made of carbon steel are about $11.7 \times 10^{-6}$ /° C and on the order of 0.12 CGS, respectively.

The extruded aluminum pipe with or without subjected to the conventional anodic oxydation process may be used as the hollow cylindrical support member 1.

In case of using the hollow cylindrical support member 1, its outer periphery may be cleaned, and then the cleaned surface may preferably be formed with a separating layer by spraying a mold releasing agent and subsequently a material suitable for the spray coated layer, for example, iron alloy or copper alloy is sprayed thereon.

In case of spraying, the distance between the metalizing gun 3 and the hollow cylindrical support member 1 may preferably be on the order of 200 mm to 250 mm. The averate temperature of the spray coated layer 2 becomes 100° to 130° C in case of using the hollow cylindrical support member 1 made of iron alloy or copper alloy. The temperature of the hollow cylindrical support member 1 having a high thermal conductivity becomes uniformly raised during spraying and all of the region thereof shows no temperature gradient.

After the spraying has been completed, the spray coated layer 2 is permitted to cool while still in place on the hollow cylindrical support member 1. The spray coated layer 2 could not follow the contraction of the hollow cylindrical support member 1 whose thermal expansion coefficient is larger than that of the spray coated layer 2 and freely contracts on the basis of its own thermal expansion coefficient. As a result, there remains no peripheral tensile stress in the spray coated layer 2.

In experimental tests, an extruded aluminum pipe 1 having an outer diameter of 38.14 mm and thickness of 2.5 mm was spray coated with a mild steel layer 2 whose thickness $t$ was 0.5 mm and then the assembly was cooled to room temperature. These experimental tests have yielded the result that the inner diameter of the spray coated layer 2 becomes 38.19 mm thereby forming a gap of about 0.05 mm between the extruded aluminum pipe 1 and the spray coated layer 2, and that there remained no peripheral tensile stress in the spray coated layer 2.

If the hollow mold core 4 as constructed by applying the spray coated layer 2 to the outer periphery of the hollow cylindrical support member 1 is subjected to a pressure as in the case of a die casting method, the mandrel 8 is closely fitted in the hollow mold core as shown in FIG. 4.

In case of applying the conventional casting technique to the hollow mold core 4, the hollow mold core 4 is incorporated into a casting mold and molten aluminum or alloy thereof is poured in the mold cavity. As the molten metal solidifies it shrinks in and around the spray coated layer 2 and is interlocked mechanically therewith forming a bond of tremendous strength.

In this case, the hollow mold core 4 and more particularly the spray coated layer 2 applied to the outer periphery of the hollow cylindrical support member 1 is heated to substantially the temperature of the molten metal, and as the molten metal solidifies, the spray coated layer 2 sandwiched between the hollow cylindrical support member 1 and the casting 7 whose thermal expansion coefficient is substantially equal to that of the hollow cylindrical support member 1 acts against the shrinking force radially inwards acting on the casting 7. Thus, the spray coated layer 2 is compressed in the direction of the thickness thereof and the contact pressure between the spray coated layer 2 and the metal casting 7 is increased, while the compressive stress in the peripheral direction of the hollow cylindrical support member 1 is remained and permitting free shrinking of the hollow cylindrical support member 1.

The compressive stress acting in the direction of the thickness of the spray coated layer 2 is remarkably increased, particularly in case of pressure casting, under the reaction acting on the outer surface of the hollow cylindrical support member 1 supported by the mandrel 8 closely fitted therein, and as a result, the spray coated layer 2 is compressed to reduce the gap between the compressed fine grains thereof to produce a stronger bond between these fine grains thereby significantly improves the mechanical property of the spray coated layer 2.

The above mentioned compressive force acting upon the spray coated layer 2 is also produced in case of applying no pressure casting technique due to the reaction caused by the shrinkage of the cast metal 7 and acting upon the surface of the hollow cylindrical support 1 thereby producing a stronger bond between fine grains of the spray coated layer 2.

If the contact pressure between the spray coated layer 1 and the cast metal 7 is increased, the interlock bond between the cast metal 7 and the fine pits and undercuts on the exposed surface of the spray coated layer 2 is improved. This interlock bond is maintained by means of the stress remained in the spray coated layer 2 in its peripheral direction, this stress persisting to a temperature lower than the solidifying point of the molten metal, that is, a prestress is maintained in the spray coated layer 2 even under thermal load subjected to castings produced by the method according to the invention.

As stated hereinbefore, the hollow cylindrical support member 1 freely shrinks as the molten metal 7 solidifies to form a small gap between the hollow cylindrical support member 1 and the spray coated layer 2.

The amount of this gap is far smaller than that of the mold cavity formed between the casting mold and the hollow mold core 4 incorporated therein, but is sufficiently large to permit the hollow cylindrical support member 1 only to be removed from the metal casting 7 interlocked with the spray coated layer 2.

In case of applying the pressure casting technique, the mandrel 8 closely fitted in the hollow cylindrical support member 1 limits more or less the free contraction of the hollow cylindrical support member 1. But, the mandrel 8 at its cold state can be removed from the hollow cylindrical support member 1 which can then be removed from the metal casting 7 interlocked with the spray coated layer 2.

The presence of the gap between the hollow cylindrical support member 1 and the spray coated layer 2 makes it possible to remove the hollow cylindrical support member 1 out of the metal casting 7 and spray coated layer 2, even though the compressive force acting upon the outer periphery of the hollow cylindrical support member 1 is large, with the aid of a punch 11 (FIG. 6) or any other tools. In this case, the spray coated layer 2 is strongly interlocked with the metal casting 7, so that there is no risk of the spray coated layer 2 being damaged.

It is preferable to remove the hollow cylindrical support member 1 with the aid of the punch 11 or any other pushing tool as mentioned above. But, if necessary, the hollow cylindrical support member 1 may be cooled at its inner periphery so as to reduce its diameter and hence can be removed from the spray coated layer 2 applied thereon. Alternatively, the hollow cylindrical support member 1 may be removed by cutting or broaching operation.

The bore surface of the spray coated layer 2 thus obtained is of a surface transplanted from the accurately finished surface of the hollow cylindrical support member 1. Thus, the outer periphery of the hollow cylindrical support member 1 merely accurately machined makes it possible to provide an accurate bore with such a high degree of accuracy that only a simple honing operation is required after the casting operation.

An extruded aluminum pipe has an accurate diameter and smooth surface so that it may be used as the hollow cylindrical support member 1 without requiring any special working to be subjected thereto.

As described above, in accordance with the invention provision must be made of a hollow cylindrical support 1 having an outer diameter D slightly smaller than the inner diameter of an accurate cylinder bore to be produced and having such a thickness $t$ that a ratio $D/t$ is 8 to 30.

If use is made of a thick hollow cylindrical support member 1 whose ratio $D/t$ is smaller than 8, its thermal capacity becomes excessively large. As a result, molten metal particles sprayed thereon is intensely coated at the surface thereof and hence it becomes difficult to obtain a strong sprayed coated layer 2. Moreover, it is difficult to cool the thick hollow cylindrical support member 1 at a rate earlier than that of cooling the spray coated layer 2 so that the thick hollow cylindrical support member 1 is prevented from freely shrinking, thereby rendering it difficult to attain the object of the invention.

If use is made of a thin hollow cylindrical support member 1 whose ratio D/t is larger than 30, there is a risk of the thin hollow cylindrical support member 1 being locally heated by gas flame or gas jet produced upon spraying the molten metal and hence being subjected to a strain. Thus, it becomes difficult to obtain a spray coated layer 2 whose dimensions are of high accuracy. Moreover, such thin hollow cylindrical support member 1 is liable to be crushed when it is subjected to the exterior force produced in case of pouring molten metal onto the spray coated layer 2, and as a result, there is a risk of the casting operation being failed.

As stated hereinbefore, the method according to the invention makes it possible to define a bore surface by the inner surface of a spray coated layer applied to an accurately finished surface of a hollow cylindrical support member and transplanted from it to a casting applied to it and hence to produce an accurate bore surface having such accuracy that, at most, troublesome machining operations are not required for finishing.

The example is given for the purpose of illustration only and is not to be considered as limiting the scope of the following claims.

What is claimed is:

1. A method of producing an accurate bore surface comprising the steps of applying a spray coated layer to the accurately finished outer surface of a hollow cylindrical support member to construct a hollow mold core, said hollow cylindrical support member being made of a material having thermal expansion coefficient and thermal conductivity which are higher than those of said spray coated layer and having an outer diameter D slightly smaller than the inner diameter of said accurate bore surface and having such thickness $t$ that a ratio $D/t$ is equal to 8 to 30, inserting said hollow core mold into a casting mold to form an annular cavity between said hollow mold core and casting mold, pouring molten aluminum or its alloy into said annular cavity, solidifying said molten aluminum or its alloy to interlock it with the outer surface of said spray coated layer, and removing said hollow cylindrical support only from said spray coated layer interlocked with said aluminum or its alloy, whereby said bore surface is defined by the inner surface of said spray coated layer transplanted from said accurately finished surface of hollow cylindrical support member to said metal casting.

2. A method as claimed in claim 1 wherein said hollow cylindrical support member is an extruded aluminum pipe.

* * * * *